(12) United States Patent
Bocokic et al.

(10) Patent No.: US 12,496,566 B2
(45) Date of Patent: Dec. 16, 2025

(54) PROCESS

(71) Applicant: GIVAUDAN SA, Vernier (CH)

(72) Inventors: Vladica Bocokic, Rueil-Malmaison (FR); Benoit Riflade, Bazas (FR)

(73) Assignee: GIVAUDAN SA, Vernier (CH)

( * ) Notice: Subject to any disclaimer, the term of this patent is extended or adjusted under 35 U.S.C. 154(b) by 517 days.

(21) Appl. No.: 17/789,585

(22) PCT Filed: Jan. 20, 2021

(86) PCT No.: PCT/EP2021/051139
§ 371 (c)(1),
(2) Date: Jun. 28, 2022

(87) PCT Pub. No.: WO2021/151748
PCT Pub. Date: Aug. 5, 2021

(65) Prior Publication Data
US 2023/0048433 A1     Feb. 16, 2023

(30) Foreign Application Priority Data
Jan. 29, 2020 (GB) ...................... 2001226

(51) Int. Cl.
*B01J 13/22*     (2006.01)
*C11D 3/50*     (2006.01)

(52) U.S. Cl.
CPC ............... *B01J 13/22* (2013.01); *C11D 3/505* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 2011/0269657 A1* | 11/2011 | Dihora | D06M 23/12 514/355 |
| 2016/0168508 A1* | 6/2016 | Ribaut | A61K 8/8152 424/401 |

FOREIGN PATENT DOCUMENTS

| | | |
|---|---|---|
| CN | 107552008 A | 1/2018 |
| EP | 2763529 A1 | 4/2013 |

(Continued)

OTHER PUBLICATIONS

International Search Report and Written Opinion of the International Searching Authority for corresponding application PCT/EP2021/051139 dated Mar. 30, 2021.

(Continued)

*Primary Examiner* — Jeffrey D Washville
(74) *Attorney, Agent, or Firm* — Norris McLaughlin, PA

(57) ABSTRACT

A method of covalently bonding a modifier to a polymeric microcapsule wall, which wall comprises entities capable of reaction with acrylic moieties, comprising the provision on the wall of a linking compound to which the modifier is subsequently attached, the linking compound having the Formula I

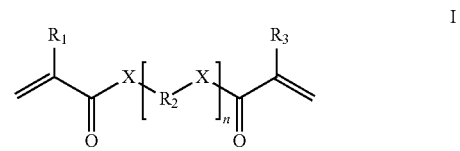

in which
n=1 to 30; $R_1$, $R_2$ and $R_3$ are independently selected from the following moieties:
$R_1$ and $R_3$ are H and Me; and
X is selected from O and NH; and
$R_2$ is selected from $CH_2$, $CH_2CH(OH)CH_2$, and $CH_2\cdot CH_2$.

(Continued)

Microcapsules thus modified exhibit enhanced substantivity to substrates such as textiles when used in laundry preparations.

16 Claims, 1 Drawing Sheet

(56) References Cited

FOREIGN PATENT DOCUMENTS

| | | |
|---|---|---|
| WO | 2013050594 A1 | 4/2013 |
| WO | 2018149775 A1 | 8/2018 |
| WO | 2019121736 A1 | 6/2019 |

OTHER PUBLICATIONS

GB Search Report for corresponding application GB 2001226.6 dated Jul. 30, 2020.

* cited by examiner

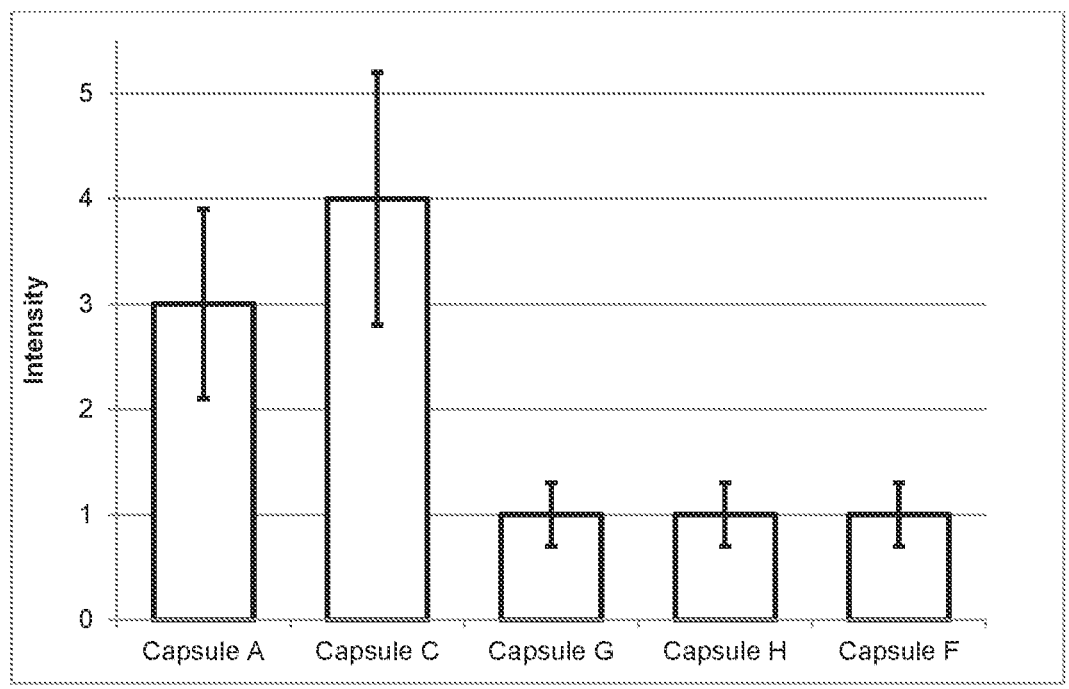

PROCESS

PROCESS

This disclosure relates to microcapsules and more particularly to microcapsules that can be stably dispersed in aqueous liquids. More particularly, it relates to the surface modification of capsules, such that they are more substantive to substrates.

Microcapsules, that is, capsules typically with average diameters of from about 50 nm to several mm, have been known and used for some time as a means of protecting encapsulated actives until they are needed. The range of encapsulated substances has been very wide, for example, dyestuffs, cells, pharmaceuticals, enzymes, pigments, flavours and fragrances. One particular application is the use of microcapsules for the delivery of fragrances in laundry applications, the object being to protect the fragrance until the point at which it is desired, at which point it is released from the capsule. A wide range of capsule wall materials is known, ranging from gelatine to acrylics, polyureas and aminoplasts. Aminoplasts such as melamine-formaldehyde resin have been particularly popular because they form excellent capsules and the material is relatively inexpensive.

It is desired to be able to deposit microcapsules on a substrate, such that they will remain there. It is also desired to be able to provide dispersibility to microcapsules in aqueous liquids, so that they remain dispersed, or at least are easily redispersed. These are not natural properties of most microcapsules, and this means that a modifier need be provided to the capsules. In this case, a modifier is a material that either has affinity for both capsule and substrate, or that confers ready dispersibility on the capsules, the ideal material being able to perform both functions. In the case of providing fragrance on laundry items during a wash, it means that the modifier must provide substantivity to the particular substrate, be it natural, such as wool or cotton, or synthetic, such as acrylics, polyamides or polyesters, or blends of these materials. Typical modifiers are non-ionic polysaccharides, such as mannan, glucan, glucomannan, xyloglucan, hydroxyalkyl cellulose, dextran, galactomannan, and mixtures thereof.

The modifier allows the microcapsules to be attached successively to the substrate. The problem with modifiers is that connection to the capsule is an equilibrium, with modifier molecules coming on and off the capsules.

It has been proposed to anchor modifiers more firmly. One approach has been to add the modifier to the dispersion of fragrance as the capsule walls are being formed, such that there is entanglement of the modifier with the formed walls, thus anchoring the modifier in piece. This has been successful in some, but not all cases. In addition, some modifiers can interact with some perfume components it a way that alters the nature of the perfume and therefore the desired hedonic effect.

A further proposal has been to bond the modifier covalently to the capsule wall. This has the advantage that the capsules can be formed and then post-modified. It is dependent on there being complementary reactive groups on both wall and modifier, and this is often not the case. One proposed way of overcoming this is to use a linking compound, that is, a compound that has functionality towards both capsule wall and modifier. Examples of this technique may be found International publications WO 2006/1172902, WO 2010/1424012 and WO 2018/149775.

It has now been found that it is possible effectively to secure microcapsules substantively to substrates by a new mechanism. There is therefore provided a method of covalently bonding a modifier to a polymeric microcapsule wall, which wall comprises entities capable of reaction with acrylic moieties, comprising the provision on the wall of a linking compound to which the modifier is subsequently attached, the linking compound having the Formula I

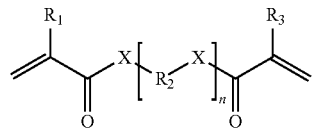

in which n=1 to 30; $R_1$, $R_2$ and $R_3$ are independently selected from the following moieties:

$R_1$ and $R_3$ are H and Me; and

X is selected from O and NH; and $R_2$ is selected from $CH_2$, $CH_2CH(OH)CH_2$, and $CH_2 \cdot CH_2$.

In addition, the disclosure also provides microcapsules prepared by a process as hereinabove described.

In particular embodiments, n is 1-23, 1-20, 1-15, 1-10, and 1-5.

In a particular embodiment, the linking compound is a compound with an acrylate moiety ($CH_2$=CH·COO—) at one end and a methacrylate entity ($CH_2$=C($CH_3$)·COO—) at the other, i.e. one of $R_1$ and $R_3$ is H and the other CH3).

In a further particular embodiment, $R_1$ and $R_3$ are both H or both $CH_3$ and X is O, the other moieties being as hereinabove described.

In a further particular embodiment, the linking compound is a compound according to Formula II or Formula III:

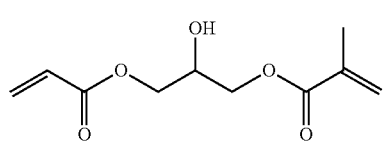

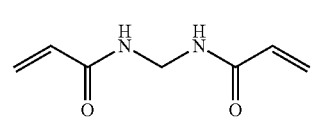

The compound of Formula II is 3-(acryloyloxy)-2-hydroxypropyl methycrylate.

The polymer from which the capsule wall is composed may be any polymer that comprises entities that are capable of reacting with acrylic moieties, that is moieties that comprise the prop-2-enoyl group $CH_2$=CH—CO—. Entities that will react with acrylic moieties are nucleophilic groups, for example, primary and secondary amines, hydroxyl, thio and phosphine (H—$PR_2$) hypophosphites $H_2P(O)OH$, and phosphonates of the type H—$PO(OH)_2$ or H—$PO(OR)_2$.

Particular examples are polymers that incorporate amine groups are aminoplasts, such as urea- and melamine-formaldehyde resins and polyurea.

The modifier may be any suitable modifier capable of reacting with the linking compound to form a covalent bond and thus be permanently linked to the capsule surface. Typical examples of modifiers include polysaccharides such as mannan, glucan, glucomannan, xyloglucan, hydroxyalkyl cellulose, dextran, galactomannan, and mixtures thereof.

The process of the invention is carried out by adding the linking compound to a slurry of capsules, followed by the modifier, the linker and an initiator.

The grafting degree of the modifier, that is, the proportion of added modifier that is attached to the capsules, may be determined by any suitable method, for example, by gel permeation chromatography or viscosity measurement. A typical procedure for sample preparation for GPC for the grafting degree determination is described in the examples.

Depending on the nature of the modification, capsules thus modified are easily redispersed, should this prove necessary, and have enhanced substantivity on desired substrates.

Capsules thus modified have much greater substantivity to substrates, in that a greater proportion of the capsules will adhere to the substrate, thus providing a much enhanced olfactory experience.

The microcapsules hereinabove described may be incorporated into any treatment preparation that is applied to a substrate. This can be, for example, a laundry preparation, such as a laundry detergent (powder or liquid) or a fabric conditioner or softener. The disclosure therefore also provides such a treatment preparation. It additionally provides a method of enhancing the substantivity to a substrate of microcapsules applied to the substrate as part of a treatment preparation, the microcapsules being prepared as hereinabove described.

The disclosure is further described with reference to the following examples, which describe particular embodiments, and which are in no way intended to be limiting. All proportions are by weight.

EXAMPLE 1

Preparation of Perfume-Containing Urea-Melamine-Formaldehyde Capsule a with Grafting of Hydroxypropylcellulose.

The following materials and quantities were used for 100 g of slurry.

| Component | Mass/g |
| --- | --- |
| Perfume | 27 |
| Water drinkable grade | 42 |
| Zemac ™ E400[1] 2.85% | 20 |
| Urea | 1 |
| NaOH 30% | 0.5 |
| Luracol ™ SO[2] | 2 |
| 3-(acryloyloxy)-2-hydroxypropyl methacrylate | 0.1 |
| Klucel ™ [3] | 4 |
| potassium persulfate 4% | 1 |
| Ethylene urea 30% | 4 |
| Total | 99.6 |

[1]Alternating copolymer of ethylene and maleic anhydride
[2]Polymethylol-melamine pre-condensate
[3] hydroxypropy cellulose M CS dispersion Prior to capsule preparation, a solution of hydrolysed ZeMac™ E400 at 2.85% in water was prepared. Similarly, a hydroxypropylcellulose dispersion was prepared one day in advance by dispersing hydroxypropylcellulose in a stirred glycerine/water solution at room temperature.

The reactor temperature was set to 35° C. and then were added: water (10 g), Zemac™ E400 prepared as above and the urea. The pH was adjusted to 4.6±0.2 using the NaOH solution while stirring, with the stirring rate was adjusted so to obtain the desired capsule size (15-20 μm). The perfume was added and stirring was continued 35° C.

A portion of Luracoll™ SD (1.4 g) was added and the temperature increased to 88° C. This temperature was maintained for 30 minutes, at which point the rest of the Luracoll™ SD (0.6 g) was added and the temperature maintained.

3-(acryloyloxy)-2-hydroxypropyl-methacrylate and the HPC were added, while the stirring and the temperature were maintained. This was followed by the addition of potassium peroxodisulfate and the temperature maintained. The rest of the water and the ethylene urea were added prior to cooling the reaction mixture.

Capsule, characterization: solid content 32%, expected 33%; $d_{50}$=18 μm: Viscosity at $5/21s^{-1}$ (25° C.)=3000/1500 mPa·s; grafted HPC≈40%.

The degree of grafting was determined by the following method.

One volume part of the capsule slurry (typically 10 ml) was diluted in two volume parts of ethanol, and the mixture placed in the ultrasonic bath for 30 minutes at 25° C. The liquid was evaporated and the solid residue suspended in pentane and sonicated again for 20 minutes. The solid was filtered off and nosed two more times using pentane. The off-white solid was collected from the filter and dried in air. A calculated quantity of this powder (40-50 mg) was suspended in 5.0 ml DMF prepared as eluent for gel permeation chromatography (0.1 mol/l of LiBr was dissolved in DMF, and this solution was filtered first over filter of 0.45 μm, and then over 0.2 μm pore size). This suspension was stirred at 60° C. during 16 hours, filtered over 0.45 μm pore size syringe filter and injected in gel permeation chromatography system. The separation was therein performed though three columns (Waters Styragel 4, 5, and 6, all 7.8×300 mm), covering overall molecular weight range up to $6 \times 10^6$ g/mol. The detection system consisted of a Heleos II Dawn8+ multiple angle laser light scattering (MALLS) and a differential refraction index (dRI, Optilab T-Rex) detectors (Both from Wyatt Technologies), allowing the detection and quantification of the residual (non-grafted) surface modifier. The conditions of the separation: 0.5 ml/min flow rate, 50° C., DMF/0.1 M LiBr as eluent.

This allowed, the determination of the recovery of the free, non-grafted polymer, and the difference from the total polymer used for grafting yields the amount of the grafted polymer.

EXAMPLE 2

Preparation of a Perfume-Containing Urea-Melamine-Formaldehyde Capsule B Using a Polysaccharide Other than HPC.

Example 1 was repeated following the exactly same procedure except that the HPC was replaced 0.5 g of a polysaccharide modified with ammonium functionalities.

Capsule slurry characterization: solid content 32.4%, expected 33.5%; $d_{50}$=7 μm; Viscosity at $5/21s^{-1}$ (25° C.)=4000/1900 mPa·s;

EXAMPLE 3

Preparation of Perfume-Containing Urea-Melamine-Formaldehyde Capsule C with Grafting of Hydroxypropylcellulose.

In a closed reactor equipped with a mechanical stirrer, 26 g of hydrolysed ZeMac™ E400 solution (2.9%) and 16 g of water are introduced at room temperature and stirred for 3 minutes at 200 RPM, Stirring was then stopped and the perfume (33 g) added into the reactor, followed by 0.2 g of Dynasylan™ AMEO (3-aminopropyltriethoxysilane). Then the stirring (700 rpm) and the heating were started, and upon reaching 35° C., the pH was adjusted to 6.0 using an aqueous solution of NaOH. Stirring was maintained for 1 hour at 35° C., when the pH was adjusted to 4.6 using aqueous solution of formic acid. To this stirred solution Luracoll SD (1.2 g) and urea (0.8 g) were added and the heating increased in order to reach 90° C. 30 minutes after reaching 90° C., 0.7 g of Luracoll were added and the heating continued for another 120 minutes.

0.1 g of 3-(acryloyloxy)-2-hydroxy-propyl methacrylate and 0.55 g of HPC were added to the reactor, followed by the potassium peroxodisulfate (KPS, 1 g of a 4% aqueous solution) in two portions during the next hour. After another hour, 4 g of an aqueous ethylene urea (30%) solution was added, followed by about 16 g water. The slurry was cooled to 25° C. over a period of 1-2 hours.

Capsule slurry characterization: $d_{50}$=17 μm; Viscosity at $5/21s^{-1}$ (25° C.)=2800/1800 mPa·s; % grafted HPC≈60%.

EXAMPLE 4

Preparation of a Perfume-Containing Polyurea Capsule D with Grafting of Hydroxypropylcellulose.

Materials

| Name | Mass |
| --- | --- |
| Water | 51 g |
| Floset™ DP CAPS 371L [1] solution | 13 g |
| Perfume | 32 g |
| Lupasol™ G100[2] commercial | 1.5 g |
| 3-(acryoyloxy)-2-hydroxypropyl-methacrylate | 0.2 g |
| Desmodur™ W1[3] | 0.3 g |
| Bayhydur™ XP2547[4] | 0.1 g |
| HPC (hydroxypropyl-cellulose) | 0.1 g |
| AIBN | 0.12 g |
| KPS[5] | 0.12 g |
| Ammonia | 1.5 g |

[1] emulsion stabiliser
[2] polyethylene imine
[3] monomeric cycloaliphatic diisocyanate
[4] hydrophilic aliphatic polysocyanale
[5] potassium persulphate Into a reactor equipped with a mechanical stirrer, at 25° C. and under gentle stirring, were introduced: water, Floset DP CAPS 371L, and Bayhydur XP2547, whereupon the stirring rate was increased to 1300 rpm. The isocyanate Desmodur and the perfume were added simultaneously to this stirred mixture, and the stirring was continued for 30 minutes.

The solution of Lupasol™ G100 in water was added to the stirred mixture and the heating was started, raising the temperature gradually from 25° C. to 85° C. over three hours, where it was maintained for another two hours.

3-(acryoyloxy)-2-hydroxypropyl-methacrylate was then added, followed by HPC (hydroxypropylcellulose, KPS and AIBN solutions in intervals of 30 minutes. The temperature and the stirring were maintained for another hour, when ammonia was added. After a brief stirring, the mixture was cooled to 25° C.

Characterisation solid content 43.2%, expected 42.1%, $d_{50}$: 14.8 μm; HPC grafting: 60-70%

EXAMPLE 5

Preparation of Perfume-Containing Resorcinol-Melamine-Formaldehyde Capsule E with Grafting of Hydroxypropylcellulose.

Materials

| Name | Mass |
| --- | --- |
| Resorcinol | 0.7 g |
| Floset™ DP/CAPS 371 L | 10 g |
| Luracoll™ SD | 1.9 g |
| Perfume | 36 g |
| Formic acid | 3.6 g |
| 3-(Acryloyloxy)-2-hydroxypropyl methacrylate | 0.1 g |
| HPC | 0.5 g |
| KPS | 0.1 g |
| Wafer | 37 g |
| 30% aqueous ethylene urea | 10 g |

In a reactor equipped with a mechanical stirrer, water, resorcinol, Floset™ DP/CAPS 371L, and Luracoll™ SD were added, and the stirring at 400 rpm was started. Once the mixture was homogenised, the perfume was added and the stirring rate increased to 950 rpm. Using formic acid, the pH was adjusted to 3.5-4.0. The temperature was gradually increased to 75° C., and maintained there for 1 hour. The pH was adjusted again with formic acid and the stirring at 75° C. was maintained far another hour.

3-(acryoyloxy)-2-hydroxypropyl-methacrylate and HPC were added to the reactor at 75° C., followed by KPS during the following hour. The stirring at 75° C. was continued for another hour. The solution of ethylene urea was added and stirring at 75° C. continued for another hour, at which point heating was stopped and the mixture cooled down to 25° C.

Capsule characterization: $d_{50}$=10.7 μm; solid content 31.7%, expected 33.3%, % HCP grafting ~40%.

EXAMPLE 6

Preparation of Perfume-Containing Urea-Melamine-Formaldehyde Capsule F without Surface Modification For the comparison purposes, a capsule F was synthesised following the procedure described in Example 1, but with omitting the step of the grafting, that is, no HPC, no 3-(acryoyloxy)-2-hydroxypropyl-methacrylate, and no KPS were added to the reaction. This is an example of a capsule without surface modification.

Capsule characterization: solid content 30%, expected 31%; $d_{50}$=17 μm; Viscosity at $5/21s^{-1}$ (25° C.)=1200/700 mPa·s.

EXAMPLE 7

Preparation of Perfume-Containing Urea-Melamine-Formaldehyde Capsule G with Surface Modification by Xyloglucan by Co-Entrapment For the comparison purposes, a capsule G was synthesiser following the procedure from Example 1, but with the omission of HPC, 3-(acryoyloxy)-2-hydroxypropyl-methacrylate, and KPS. The difference from capsule A was the addition of 0.3 g xyloglucan together with the addition of Luracoll SD at 88° C. This is an example of a capsule where the surface modification is performed by the co-entrapment of the modifier in the outer layer of the capsule surface.

Capsule characterization: solid content 32%, expected 33%; $d_{50}$=17.5 μm; Viscosity at 5/21s$^{-1}$ (25° C.)=2800/1100 mPa·s.

EXAMPLE 8

Preparation of Perfume-Containing Urea-Melamine-Formaldehyde Capsule H with Surface Modification by Hydroxypropylcellulose by Co-Entrapment For comparison purposes, a capsule H was prepared following the procedure from Example 1, but under omission of 3-(acryoyloxy)-2-hydroxypropyl-methacrylate, and KPS. The HPC was added (same quantity as in Example 1) together with Luracoll as 88° C. This is an example of a capsule where the surface modification was performed by co-entrapment of the modifier in the outer layer of the capsule surface.

Capsule characterization: solid content 19%, expected 33%; $d_{50}$=17 μm; Viscosity at 5/21s$^{-1}$ (25° C.)=3000/1500 mPa·s; greed HPC≈20%.

The low solid content measurement shows that the capsules cannot resist drying that is, the encapsulated fragrance leaks out of the capsules when these are dried, either because they break mechanically, or because the shell are insufficiently impermeable to prevent fragrance evaporation. Either way, this represents an example of a poor fragrance encapsulation, possibly as a result of interference of the modifier molecule with the encapsulation process.

EXAMPLE 9

Demonstration of the Necessity of the Components Required for the Grafting of Modifier.

Example 1 was repeated, omitting one or more molecules used at the grafting stage (indicated by the "−" for toe absence of the molecule and "+" for the presence of the molecule), Thus, No. 1 in the table below represents a synthesis where only HPC was added, and the linker and radical initiators were omitted. The entries 5-7 in the table describe a variation of the radical initiator and its impact on the grafting. The grafting percentage was determined by the method described in Example 1.

| Nr. | Linker | HPC | KPS | AIBN | 2,2'-azobis-(2-methylpropionamidine)-dihydrochloride | HPC recovery (%) | HPC grafting (%) |
|---|---|---|---|---|---|---|---|
| 1 | — | + | — | — | — | >95 | 0 |
| 2 | — | + | + | — | — | >95 | 0 |
| 3 | + | + | — | — | — | >95 | 0 |
| 4 | + | + | + | — | — | ~50 | 50 |
| 5 | + | + | — | + | — | >70 | 30 |
| 8 | + | + | + | + | — | ~50 | 50 |
| 7 | + | + | — | — | + | ~50 | 50 |

It can be seen that

In Nos. 1-3, almost no HPC is grafted (recovery is nearly complete), demonstrating that the absence of one of the modifier (HPC), linker or initiator leads to almost non-existent grafting.

In No. 4 (identical to Example 1), there is 50% grafting, a substantial result.

In No. 5, the use of AIBN initiator (oil-soluble) delivers a result that is slightly worse than that of No. 4, but still acceptable.

In No. 6, the combination of the two tapes of initiator showed no improvement over the KPS used alone.

In No. 7, the use of 2,2'-azobis-(2-methylpropionamidine)-dihydrochloride initiator gives a result equal to that of No. 4.

EXAMPLE 10

Demonstration of the Olfactory Benefit of the Grafting of HPC on Polyester Substrate (T-Shirts)

The polyester is known to be a difficult substrate for fragrance deposition, especially for the deposition of encapsulated fragrance, probably because of the smooth and hard surface of the polyester fibres, which offers very small contact area for the fragrance capsule, necessitating high adhesion energy between the two objects in order to achieve high off performance.

Liquid detergent samples containing the capsules A, C, F, G, and H, as prepared in examples 1, 3, 6, 7, and 8 respectively were prepared by dispersing a slurry of these capsules in identical quantities (50 g) of a liquid detergent base. The level of the fragrance concentration was identical in all of the samples. Each was subjected to a wash cycle in standard European washing machines (front load) with 5 cotton towels and three polyester T-shirts, with additional cotton sheets to complete the machine load to 5 kg.

Upon drying, the post-rub fragrance boost performance was evaluated by noting the level of the fragrance intensity perceived after gentle rubbing of the substrate in order to crush the capsules and liberate the fragrance. The fragrance was assessed by a panel of 7 expert testers. Capsule G was taken as the standard (one in which the modifier was incorporated by the art-recognised method of entrapment). The olfactory assessment was based on a scale of 1—no difference or poorer than the standard capsule
2—slightly stronger than the standard capsule
3—significantly stronger than the standard capsule
4—considerably stronger than the standard capsule.

The figures were averaged and the results are shown in FIG. 1. It can be seen that the performance of the samples in which the modifier was grafted in a covalent manner (A and C) was significantly higher than that of the other samples. The capsule I with its low performance demonstrates that the co-entrapment route to the surface modification is not the way to introduce this particular modifier. While the capsule G can be prepared by co-entrapment, its performance is still lower than that of A and C, but higher than the performance of the non-modified capsule F.

Thus, this example demonstrates not only the benefit of surface modification of capsules for higher olfactory performance (F vs. A, C, and G), but also highlights the advantage of the covalent grafting versus the co-entrapment strategy, especially when the molecules of interest cannot be used in the entrapment method.

| Capsule | Example | Note Polyester T-shirt | Comment |
|---|---|---|---|
| A | 1 | 3 | Covalent grafting (HPC) |
| C | 3 | 4 | Covalent grafting (HPC) |
| F | 6 | 1 | No modifier |
| G | 7 | 1 | Co-entrapment (xyloglucan) |
| H | 8 | 1 | Co-entrapment (HPC) |

The invention claimed is:

1. A method of covalently bonding a modifier to a polymeric microcapsule wall, which wall comprises entities capable of reaction with acrylic moieties, comprising: providing on the wall a linking compound to which the modifier is subsequently bound, the linking compound having the Formula I

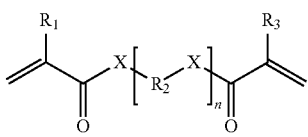

in which
n=1 to 30;
$R_1$, $R_2$ and $R_3$ are independently selected from the following moieties:
$R_1$ and $R_3$ are H or Me; and
X is selected from O and NH; and
$R_2$ is selected from $CH_2$, $CH_2CH(OH)CH_2$, and $CH_2 \cdot CH_2$.

2. The method of claim 1, in which n is selected from the group consisting of 1-23, 1-20, 1-15, 1-10, or 1-5.

3. The method of claim 1, in which the linking compound is a compound with an acrylate moiety ($CH_2$=CH·COO—) at one end and a methacrylate entity ($CH_2$=C($CH_3$)·COO—) at the other end.

4. The method of claim 1, in which $R_1$ and $R_3$ are both H or both $CH_3$ and X is O.

5. The method of claim 1, in which the linking compound is a compound selected from the group consisting of compounds of Formula II or Formula III:

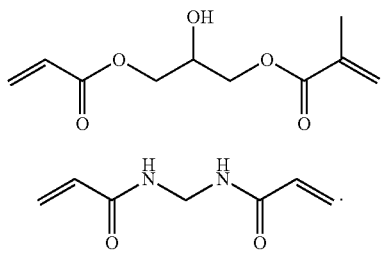

6. The method of claim 5, in which the linking compound is 3-(acryloyloxy)-2-hydroxypropyl methycrylate.

7. The method of claim 1, in which the polymeric microcapsule wall comprises amine groups.

8. The method of claim 7, in which the polymeric material of the microcapsule wall is selected from the group consisting of aminoplasts, urea- and melamine-formaldehyde resins, and polyurea.

9. The method of claim 1, in which the modifier is selected from at least one polysaccharide.

10. The method of claim 9, in which the polysaccharide is selected from the group consisting of mannan, glucan, glucomannan, xyloglucan, hydroxyalkyl cellulose, dextran, galactomannan, or mixtures thereof.

11. The method of claim 1, in which the microcapsules contain fragrance.

12. Microcapsules prepared by the method of claim 1.

13. A treatment preparation, comprising microcapsules according to claim 12.

14. A method of enhancing the substantivity to a substrate of microcapsules applied to the substrate as part of a treatment preparation, the microcapsules being prepared according to the method of claim 1.

15. The method of claim 14, in which the treatment preparation is a laundry product and the microcapsules contain fragrance.

16. The treatment preparation of claim 13, which is a laundry preparation.

* * * * *